US012081396B2

(12) United States Patent
Vaishnavi

(10) Patent No.: US 12,081,396 B2
(45) Date of Patent: Sep. 3, 2024

(54) TRIGGER-BASED CONTROL LOOP STATE TRANSITION

(71) Applicant: Lenovo (Singapore) Pte. Ltd., New Tech Park (SG)

(72) Inventor: Ishan Vaishnavi, Munich (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/015,485

(22) PCT Filed: Jul. 12, 2021

(86) PCT No.: PCT/IB2021/056261
§ 371 (c)(1),
(2) Date: Jan. 10, 2023

(87) PCT Pub. No.: WO2022/009187
PCT Pub. Date: Jan. 13, 2022

(65) Prior Publication Data
US 2023/0291660 A1  Sep. 14, 2023

Related U.S. Application Data

(60) Provisional application No. 63/050,308, filed on Jul. 10, 2020.

(51) Int. Cl.
*H04L 41/0816* (2022.01)
*H04L 41/0604* (2022.01)

(52) U.S. Cl.
CPC ...... *H04L 41/0816* (2013.01); *H04L 41/0627* (2013.01)

(58) Field of Classification Search
CPC ............ H04L 41/0816; H04L 41/0627; H04L 41/5009
See application file for complete search history.

(56) References Cited

U.S. PATENT DOCUMENTS

| 2018/0260745 A1* | 9/2018 | Jana | G06F 9/4806 |
| 2019/0081879 A1* | 3/2019 | Wu | H04L 41/0895 |
| 2020/0014581 A1* | 1/2020 | Aaron | H04L 41/40 |

OTHER PUBLICATIONS

PCT/IB2021/056261, "Notification of Transmittal of the International Search Report and the Written Opinion of the International Searching Authority, or the Declaration", International Searching Authority, Sep. 23, 2021, pp. 1-14.
ETSI, "Zero-touch network and Service Management (ZSM); Reference Architecture", ETSI GS ZSM 002 V1.1.1, Aug. 2019, pp. 1-80.

(Continued)

*Primary Examiner* — Joe Chacko
(74) *Attorney, Agent, or Firm* — Kunzler Bean & Adamson

(57) ABSTRACT

Apparatuses, methods, and systems are disclosed for trigger-based control loop state transition. One apparatus includes a processor that enables at least one trigger for a control loop of a control system of a mobile wireless communication network in response to a request from an assurance control loop consumer ("ACLC") and associates the at least one trigger with at least one control loop state transition such that the at least one control loop state transition is activated in response to the at least one trigger being triggered.

17 Claims, 8 Drawing Sheets

(56) References Cited

OTHER PUBLICATIONS

ETSI, "Zero-touch network and Service Management (ZSM); Terminology for concepts in ZSM", ETSI GS ZSM 007 V1.1.1, Aug. 2019, pp. 1-11.
ETSI, "Zero-touch network and Service Management (ZSM); Closed-Loop Automation; Part 1: Enablers", ETSI GS ZSM 009-1 V1.1.1, Jun. 2021, pp. 1-40.
Huawei et al., "Update Clause 4.2 Management control loops", 3GPP TSG-SA5 Meeting #130e S5-203219, Apr. 20-28, 2020, pp. 1-3.
3GPP, "3rd Generation Partnership Project; Technical Specification Group Services and System Aspects; Management and orchestration; Study on enhancement of Management Data Analytics (MDA) (Release 17)", 3GPP TR 28.809 V0.4.0, Jun. 2020, pp. 1-49.
3GPP, "3rd Generation Partnership Project; Technical Specification Group Services and System Aspects; Management and orchestration; Generic management services; (Release 16)", 3GPP TS 28.532 V16.3.0, Mar. 2020, pp. 1-230.
3GPP, "3rd Generation Partnership Project; Technical Specification Group Services and System Aspects; Management and orchestration; Management services for communication service assurance; Requirements (Release 16)", 3GPP TS 28.535 V2.0.0, Jun. 2020, pp. 1-16.
3GPP, "3rd Generation Partnership Project; Technical Specification Group Services and System Aspects; Management and orchestration; Management services for communication service assurance; Stage 2 and stage 3 (Release 16)", 3GPP TS 28.536 V1.0.0, Jun. 2020, pp. 1-19.
3GPP, "3rd Generation Partnership Project; Technical Specification Group Services and SystemAspects; Management and orchestration; 5G Network Resource Model (NRM); Stage 2 and stage 3 (Release 16)", 3GPP TS 28.541 V16.4.1, Mar. 2020, pp. 1-324.

* cited by examiner

TRIGGER-BASED CONTROL LOOP STATE TRANSITION

CROSS-REFERENCE TO RELATED APPLICATIONS

This application claims priority to U.S. Provisional Patent Application No. 63/050,308 entitled "ENABLING TRIGGER-BASED CONTROL LOOP EXECUTION STATE TRANSITION" and filed on Jul. 10, 2021, for Ishan Vaishnavi, which is incorporated herein by reference.

FIELD

The subject matter disclosed herein relates generally to wireless communications and more particularly relates to trigger-based control loop state transition.

BACKGROUND

In certain wireless communication systems, a User Equipment device ("UE") is able to connect with a fifth-generation ("5G") core network (i.e., "5GC") in a Public Land Mobile Network ("PLMN") In wireless networks, control loops may be used to perform various tasks or procedures within the network.

BRIEF SUMMARY

Disclosed are procedures for trigger-based control loop state transition. Said procedures may be implemented by apparatus, systems, methods, and/or computer program products.

An apparatus for trigger-based control loop state transition, in one embodiment, includes a processor that enables at least one trigger for a control loop of a control system of a mobile wireless communication network in response to a request from an assurance control loop consumer ("ACLC") and associates the at least one trigger with at least one control loop state transition such that the at least one control loop state transition is activated in response to the at least one trigger being triggered.

Another apparatus for trigger-based control loop state transition, in one embodiment, includes a transceiver that sends a request to a control loop manager to enable at least one trigger for a control loop of a control system of a mobile wireless communication network, the at least one trigger triggering at least one control loop state transition for the control loop, and receives an acknowledgement from the control loop manager that the at least one trigger is enabled for the control loop.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
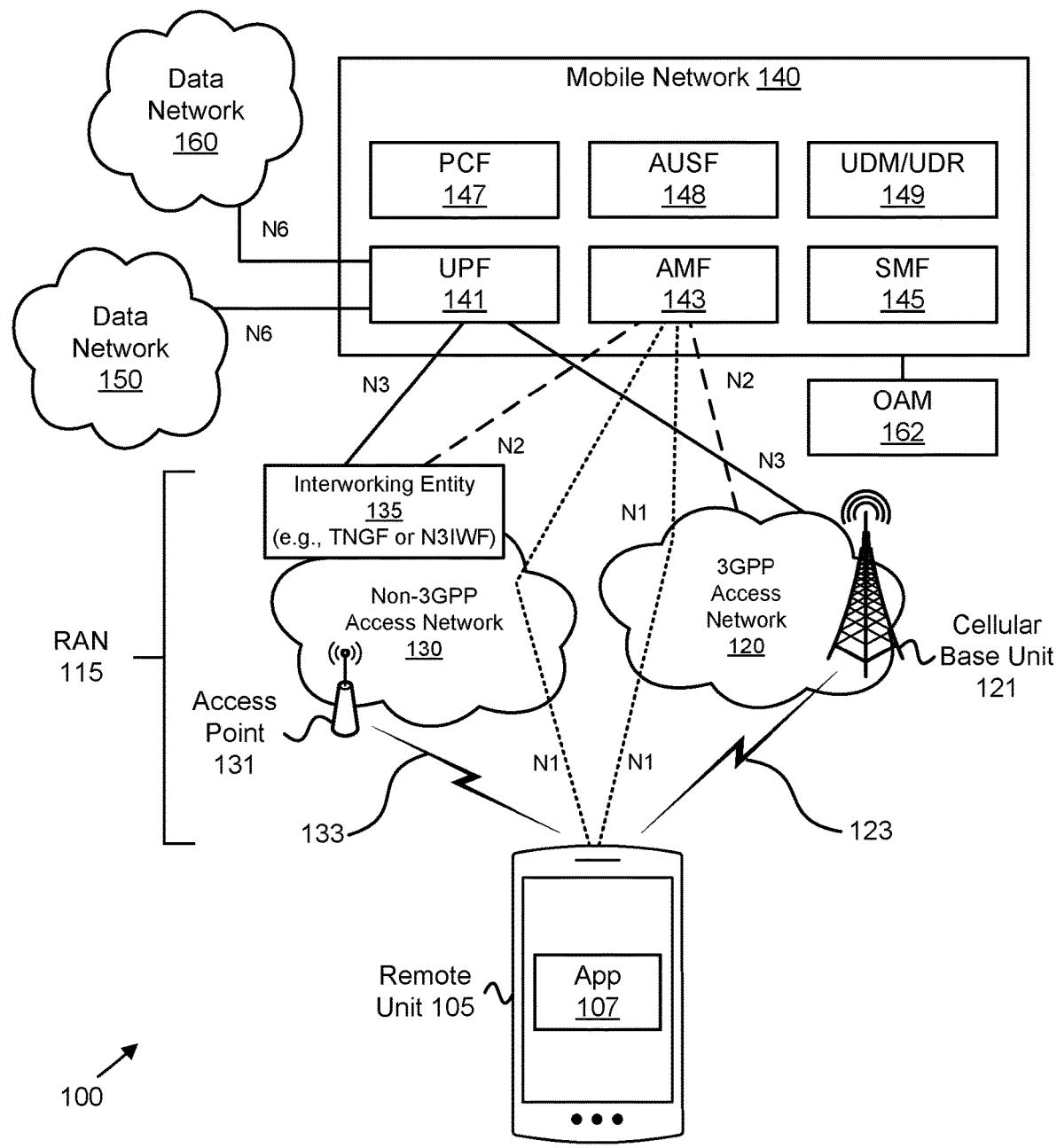
FIG. 1 is a schematic block diagram illustrating one embodiment of a wireless communication system for trigger-based control loop state transition.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for trigger-based control loop state transition. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Vendor equipment or solutions may come with built-in control loops that the operator may not be able to control. However, the operator may not want those control loops to run all the time. In conventional embodiments, the capability of operators to control the execution of control loops is very binary, e.g., either enable or disable. Additionally, it may be possible for an operator to pause and play control loop execution; however, this is still not enough. For instance, an operator may not want the energy efficiency managing control loop to run during peak periods. This is currently not possible.

In general, the subject matter disclosed herein describes changing the execution state of control loops, both open- and closed-loop control loops, based on a trigger in the network. The trigger may be any event in the network or the respective management domain. A notification may be sent with detailed status and relevant information when a state change occurs.

In one embodiment, the proposed solution enables dynamic changes in a control loop's state in response to certain conditions or other events. For example, an energy efficiency closed loop may only run during off peak hours to shut down managed elements not being used. In this example, the trigger may be the change in time of day, or the network load and the closed loop state transition is its corresponding activation (with network load decreasing below a certain threshold) or deactivation (when network load increases again beyond a certain threshold).

FIG. 1 depicts a wireless communication system 100 for trigger-based control loop state transition, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

The Operations, Administration and Maintenance ("OAM") 162 is involved with the operating, administering, managing, and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 162 may also be involved with provisioning, i.e., the setting up of the user accounts, devices, and services.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In general, the subject matter disclosed herein describes changing the execution state of control loops, both open- and closed-loop control loops, based on a trigger in the network. The trigger may be any event in the network or the respective management domain. A notification may be sent with detailed status and relevant information when a state change occurs.

Beneficially, in one embodiment, the proposed solution enables dynamic changes in a control loop's state in response to certain conditions or other events. For example, an energy efficiency closed loop may only run during off peak hours to shut down managed elements not being used. In this example, the trigger may be the change in time of day, or the network load and the closed loop state transition is its corresponding activation (with network load decreasing below a certain threshold) or deactivation (when network load increases again beyond a certain threshold).

Regarding management domains, as used herein, management domains may refer to a collection of resources that have their own management system. In one embodiment, a management system is, for example, any set of management services or their implementations in management functions. Thus, management domains may include things such as vendor devices with their own management system, vendor solutions, technical domains such as 3GPP core, 3GPP RAN, cloud domains, datacenters, transport networks with their own controllers, operator administrative domains, country domains and so forth.

Regarding open and closed control loops, open loops involve the operator to be a part of at least one of the stages in the loop, while in the closed loop stage the operator only defines a goal for the closed control loop and the loop, once configured, runs automatically. Both control loops attempt to control the status of a managed object trying to keep it to as close as possible to an operator specified desired state.

In closed loop models such as OODA (Observe, Orient, Decide, Act), MAPE-K (Monitor, Analyze, Plan, Execute over a shared Knowledge base) and so forth, the control loops are composed of multiple stages, which may not be fixed, but the stages primarily involve some sort of observation of the system, some sort of analytics of the observed information, a comparison with the desired state, a decision of what action to take based on the comparison, and the execution of those decisions. Stages may exchange information with each other over a knowledge base. However, stages may be skipped, or further stages may be added, creating closed loops with any number of stages. The stages with observation of the system and execution of the decisions are normally mandatory.

Regarding managing the execution of control loops, pause points may be enabled in a control loop e.g., by an operator. This is still simplistic as the operator cannot specify execution of the control loops based on certain states of the network. For example, the operator may enable a specific pause point in a closed loop to review a frequent action that is happening in the network such as oscillation of certain configuration. By the action of enabling the pause point, the closed loop pauses its execution stopping the oscillations from happening. This means that the act of pausing the closed loop may cause the original issue the operator wants to address disappear. More generally, however, this does not solve the problem when the operator trusts the execution of the control loop 90% of the time and only wants to review the actions 10% of the time.

Regarding control loop execution management services, the control loop's execution management service provides the ability to pause the execution of a closed loop at an "pause point." A pause point within a closed loop may be a place where the execution of the closed loop can be stopped by design. When a pause point is enabled, the control loop execution automatically stops in that part of the closed loop and the consumer that enabled the pause point may be notified. The service consumer may then choose to go ahead with the execution or suspend further execution of the closed loop. The management service is described below in Table 1.

TABLE 1

| Service description | |
|---|---|
| Service name | Control loop execution management service |
| External Visibility | Optional |
| Service functionalities | |
| Provide control loop pause information (O) | Provide the supported pause points related to a control loop and the related information. |
| Enable/Disable pause point (M) | Provides an ability for the service consumer to enable or disable a pause point for a particular control loop. |
| Provide notification for a pause point reached (M) | The service provides a notification to the subscribers once a pause point is hit. For enabled pause points this notification is mandatorily transmitted to the operator (the service consumer) that enabled it. For disabled pause points the notification may just be used for logging purposes |
| Continue control loop execution (M) | The service consumer asks for continuing a paused control loop execution. |
| Pause a control loop (O) | Pause a control loop as soon as possible at the next feasible pause point. |

In general, the subject matter disclosed herein enables the change in state of a control loop based on a predefined trigger (e.g., an event or condition) in the system. This set of features proposed and claimed in this idea that may be required on vendor equipment/solutions/management domains that contain control loops include management, which may include create, read, update, delete, and/or activate/deactivate a (set of) trigger(s) (e.g., a condition or an event) in the network or the management domain associated with causing a change of state in a control loop. This may be referred to herein as trigger-CL state association. Changes of state includes, but are not limited to:

a. Activation of a control loop
 b. Deactivation of a control loop
 c. Pausing a control loop
 d. Suspension of a control loop
 e. Continuing a control loop Another solution described herein is that for every change of state in the control loop provides an ability to configure a notification to the OAM/Operator 162 or log it into the system logs.

Figure 2:
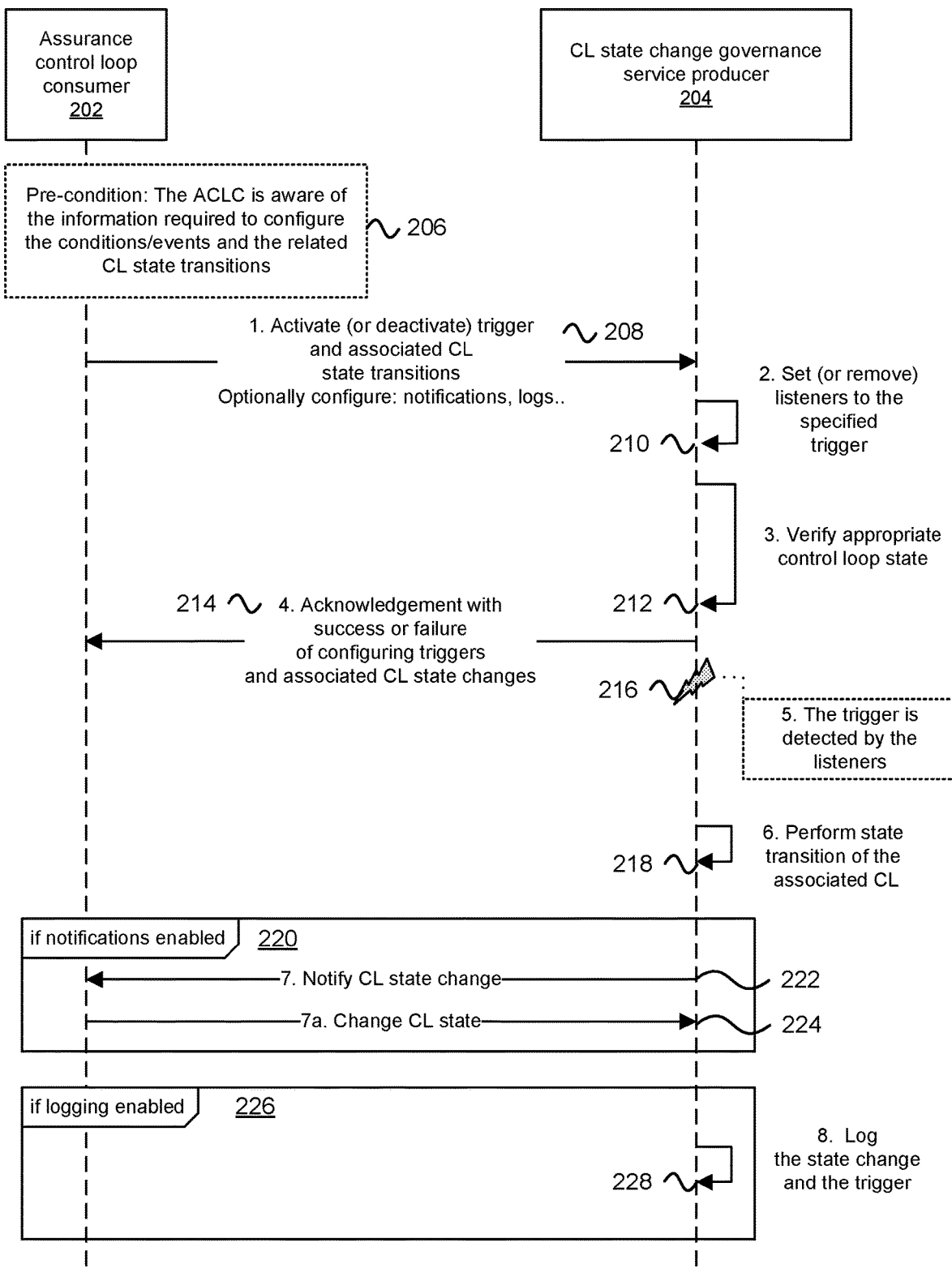
FIG. 2 is a signal flow diagram illustrating an example scenario for enabling pause points and receiving pause notifications for trigger-based control loop state transition.

FIG. 2 depicts a procedure flow 200 describing how such a solution would be used. In one embodiment the assurance control loop consumer ("ACLC") 202 refers to the system administrator, operator (possibly acting via a dashboard), another control loop, and/or any other entity (including software) that is authorized to configure the conditions in the control loop state change governance service producer ("CLscgsP") 204 that influences the execution of a control loop.

In one embodiment, the CLscgsP 204 is a logical entity that supports the interface to manage the configuration of triggers and control loop state associations that, when triggered, can cause control loop state changes. The term service producer, in one embodiment, refers to the implementation of a given management service or functionality. Even though FIG. 2 shows a single logical entity, the subject matter disclosed herein may include a collection of software and/or hardware entities.

As a precondition (see block 206), in one embodiment, the ACLC 202 is aware of the information required to configure the conditions/events and the related control loop state transitions. At step 1, the ACLC 202 may activate or deactivate (see messaging 208) a (set of) trigger (s) and associated control loop loop state transitions. Examples of triggers may include, but are not limited to:

a. Values of KPIs or attributes in the network, such as:
  i. Downlink throughput >5 Mbps (KPI)
  ii. BeamTilt is set to 45°
 b. Events in the network, such as:
  i. New managed element ID 4 provisioning request received
  ii. Managed element ID 2 deactivated
 c. Time of the day
 d. Operator request
 e. Other control loop state changes
 f. Any combination of the above The one or more triggers that one or more control loop state transitions may be associated can include:

a. Activation of a control loop
 b. Deactivation of a control loop
 c. Pausing a control loop
 d. Suspension of a control loop
 e. Continuing a control loop
 f. Execution of x number of iterations of the control loop Optionally, the operator may configure (in addition to control loop state transition)

a. Enabling (or disabling) notifications for control loop state transition
 b. Enabling (or disabling) logging of control loop state transitions At step 2, the CLscgsP 204 may optionally configure 210 internal listeners for the trigger. This may be internal to the network or management domain implementation. At step 3, the CLscgsP 204 may optionally perform 212 a sanity check internal to the network or management domain. This may include such steps as verifying that the associated control loops exist or that the CLscgsP 204 has to authority to execute the requested control loop state change when triggered.

At step 4, in one embodiment, the CLscgsP 204 sends (see messaging 214) an acknowledgement to the ACLC 202 with a success or failure of configuring triggers and the associated control loop state changes.

At step 5, in one embodiment, a trigger is detected 218 by the listeners in the network or the management domain, as configured in step 2. At step 6, in one embodiment, the CLscgsP 204 performs 218 a control loop state transition associated with the trigger. This may be done, for example, using the closed loop governance service of ETSI GS ZSM009-1 V0.7.2 or the closed loop execution service specified above.

At step 7, if notifications are enabled 220, in one embodiment, the CLscgsP 204 notifies (see messaging 222) the ACLC 202 of the control loop state change. At step 7a, in further embodiments, the ACLC 202 issues ("see messaging 224") a direct control loop state change request. At step 8, in one embodiment, if logging is enabled 226, the CLscgsP 204 logs 228 the control loop state transition.

An example of a management service specification that supports this idea is shown in Table 2 below:

TABLE 2

An example management service specification. Each functionality may be specified independently

| Service name | Control loop state change governance service Service functionalities |
| --- | --- |
| Activate/deactivate triggers(M) | Activate or deactivate a trigger-CL association. This could additionally include activation/deactivation of notifications, logs etc. |
| Manage triggers (M) | Create, read, update, delete triggers-CL associations and associated details. This functionality manages which set of triggers is associated with which set of control loops. |
| Provide notification for trigger received (O) | Provide a notification when an activated trigger is received |

TABLE 2-continued

An example management service specification. Each
functionality may be specified independently

| | |
|---|---|
| Provide notification for CL state change (O) | Provide a notification when a CL state change is executed based on an activated trigger. |
| Log CL state change (O) | Log a change in CL state |

In one embodiment, the functionalities above may be spread over multiple control loop related management services specifications and/or implementations and may be specific to closed or open control loops.

Figure 3:
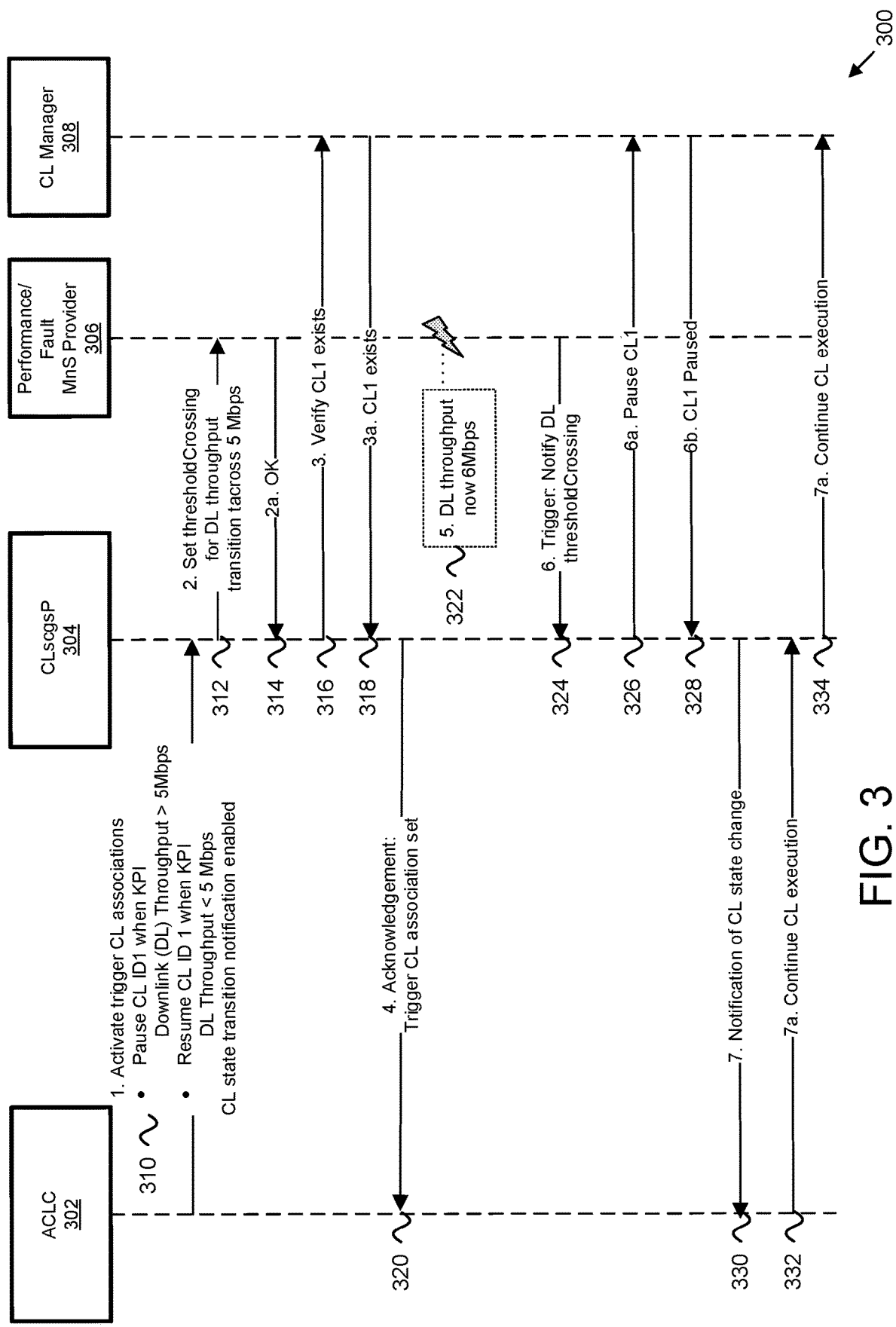
FIG. 3 is a signal flow diagram illustrating one example embodiment of a procedure for trigger-based control loop state transition.

FIG. 3 depicts an example procedure flow 300 of trigger-based control loop execution as it relates to a 3GPP management domain. At step 1, in one embodiment, the ACLC 302 activates (see messaging 310) a trigger related to downlink throughput on ME ID 1 and CL ID 1. When the DL throughput rises above 5 Mbps, CL ID 1 should be paused. When the DL II) throughput falls below 5 Mbps, the CL automatically resumes. Therefore, there are two trigger associations in this case, one for going above 5 Mbps and the other for going below 5 Mbps.

At step 2, in one embodiment, the CLscgSP 304 sets (see messaging 312) thresholdCrossing values in the appropriate fault or performance service producer 306 (e.g., the performance threshold monitoring service producer in TS28.532). At step 2a, the fault or performance service producer 306 sends (see messaging 314) an acknowledgement "success" message to the CLscgSP 304.

At step 3, in one embodiment, the CLscgsP 304 verifies (see messaging 316) that the control loop exists within a control loop manager 308. The control loop manager 308, in certain embodiments, is the entity that is responsible for the management of control loops in the network or respective management domain. This could be, for example, an implementation of the closed loop governance service specified in ETSI GS ZSM009-1 v0.7.2 or the control loop execution management service producer specified above. At step 3a, in one embodiment, the CL manager 308 sends (see messaging 318) an acknowledgement that the control loop exists.

In one embodiment, at step 4, the CLscgsP 304 sends (see messaging 320) an acknowledgement to the ACLC 302 that the triggers are successfully associated with the control loop state transitions. At step 5, in one embodiment, the fault or performance service producer 306 detects (see block 322) that the DL throughput crosses over 5 Mbps to a value of 6 Mbps.

In further embodiments, at step 6, a notifyThresholdCrossing (e.g., as defined in TS28.532) notification is sent (see messaging 324) to the CLscgsP 304. At step 6a, in one embodiment, the CLscgsP 304 pauses (see messaging 326) the execution of CL1 via the CL manager 308, e.g., using the control loop execution management service implementation specified above. At step 6b, in one embodiment, the CL manager 308 pauses the execution of CL1 and notifies (see messaging 328) the CLscgsP 304 that the execution of CL1 is paused.

At step 7, in one embodiment, because notifications for control loop state changed are enabled in step 1, a notification is sent (see messaging 330) to the ACLC 302 of the control loop state change, which may include further details on the control loop. In certain embodiments, at step 7a, the ACLC 302 decides to continue control loop execution (see messaging 332/334), which may be a direct request for control loop state change. Note that the CLscgsP 304 could be part of the CL manager 308.

Figure 4:
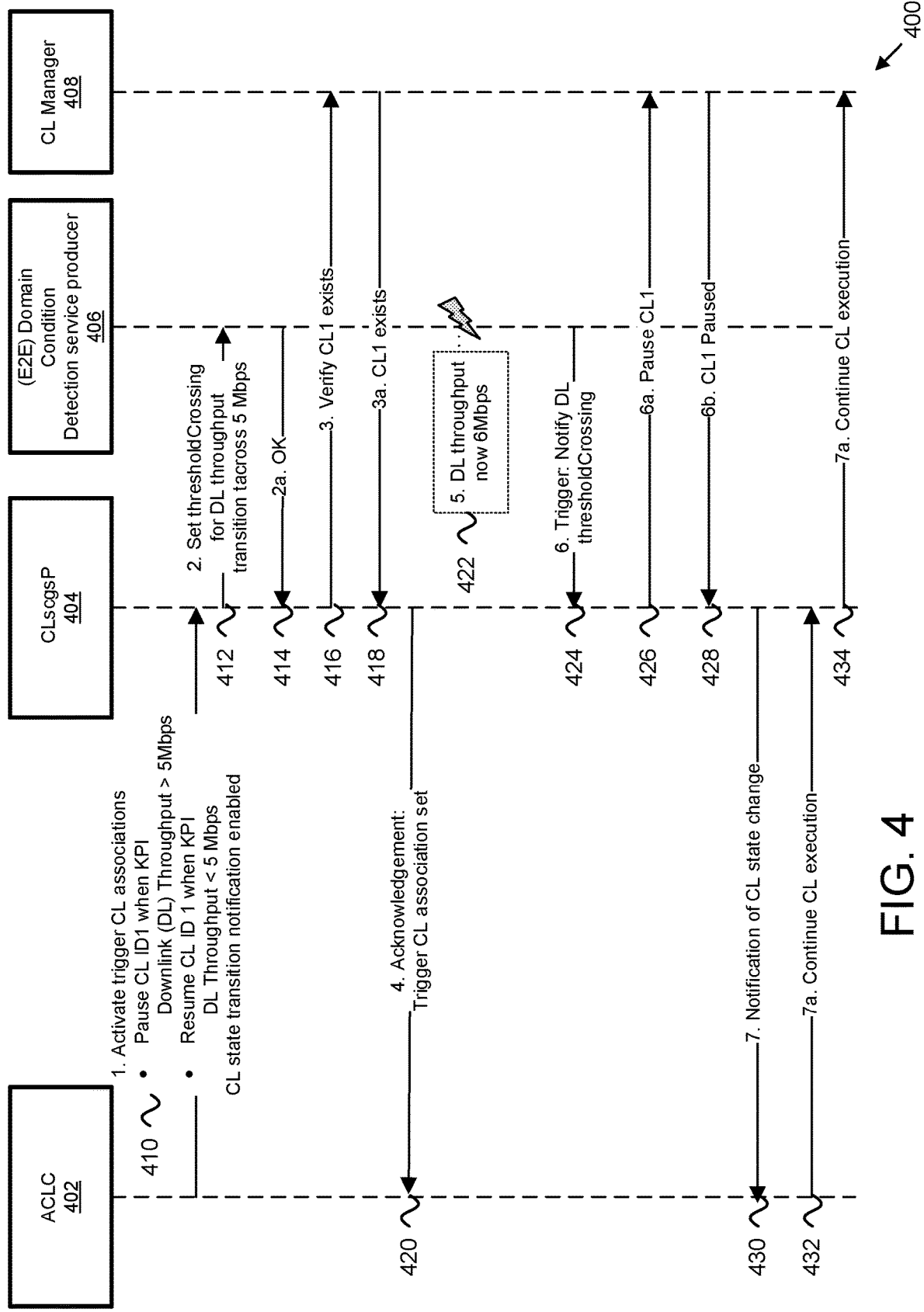
FIG. 4 is a signal flow diagram illustrating another example embodiment of a procedure for trigger-based control loop state transition.

FIG. 4 depicts an example procedure flow 400 of trigger-based control loop execution based on an ETSI ZSM implementation. The implementation depicted in FIG. 4, in one embodiment, may be identical to the SA5 embodiment described above in FIG. 3, except the Performance/Fault MnS provider 306 is replaced by the E2E or the domain condition detection service implementation 406. The (E2E) domain condition detection service 406 may be embodied as one described in ETSI GS ZSM 002 V1.1.1. Steps 2 and 6 refer to activating conditions and notifying condition changes, respectively. Also, it is noted that the CLscgS 404 could implemented as part of the CL Manager 408.

At step 1, in one embodiment, the ACLC 402 activates (see messaging 410) a trigger related to downlink throughput on ME ID 1 and CL ID 1. When the DL throughput rises above 5 Mbps, CL ID 1 should be paused. When the DL throughput falls below 5 Mbps, the CL automatically resumes. Therefore, there are two trigger associations in this case, one for going above 5 Mbps and the other for going below 5 Mbps.

At step 2, in one embodiment, the CLscgSP 404 sets (see messaging 412) thresholdCrossing values in the (E2E) domain condition detection service 406 (e.g., the performance threshold monitoring service producer in TS28.532). At step 2a, the (E2E) domain condition detection service 406 sends (see messaging 414) an acknowledgement "success" message to the CLscgSP 404.

At step 3, in one embodiment, the CLscgsP 404 verifies (see messaging 416) that the control loop exists within a control loop manager 408. The control loop manager 408, in certain embodiments, is the entity that is responsible for the management of control loops in the network or respective management domain. This could be, for example, an implementation of the closed loop governance service specified in ETSI GS ZSM009-1 v0.7.2 or the control loop execution management service producer specified above. At step 3a, in one embodiment, the CL manager 408 sends (see messaging 418) an acknowledgement that the control loop exists.

In one embodiment, at step 4, the CLscgsP 404 sends (see messaging 420) an acknowledgement to the ACLC 402 that the triggers are successfully associated with the control loop state transitions. At step 5, in one embodiment, the (E2E) domain condition detection service 406 detects (see block 422) that the DL throughput crosses over 5 Mbps to a value of 6 Mbps.

In further embodiments, at step 6, a notifyThresholdCrossing (e.g., as defined in TS28.532) notification is sent (see messaging 424) to the CLscgsP 404. At step 6a, in one embodiment, the CLscgsP 404 pauses (see messaging 426) the execution of CL1 via the CL manager 408, e.g., using the control loop execution management service implementation specified above. At step 6b, in one embodiment, the CL manager 408 pauses the execution of CL1 and notifies (see messaging 428) the CLscgsP 404 that the execution of CL1 is paused.

At step 7, in one embodiment, because notifications for control loop state changed are enabled in step 1, a notification is sent (see messaging 430) to the ACLC 402 of the control loop state change, which may include further details on the control loop. In certain embodiments, at step 7a, the ACLC 402 decides to continue control loop execution (see messaging 432/434), which may be a direct request for control loop state change. Note that the CLscgsP 404 could be part of the CL manager 408.

Figure 5:
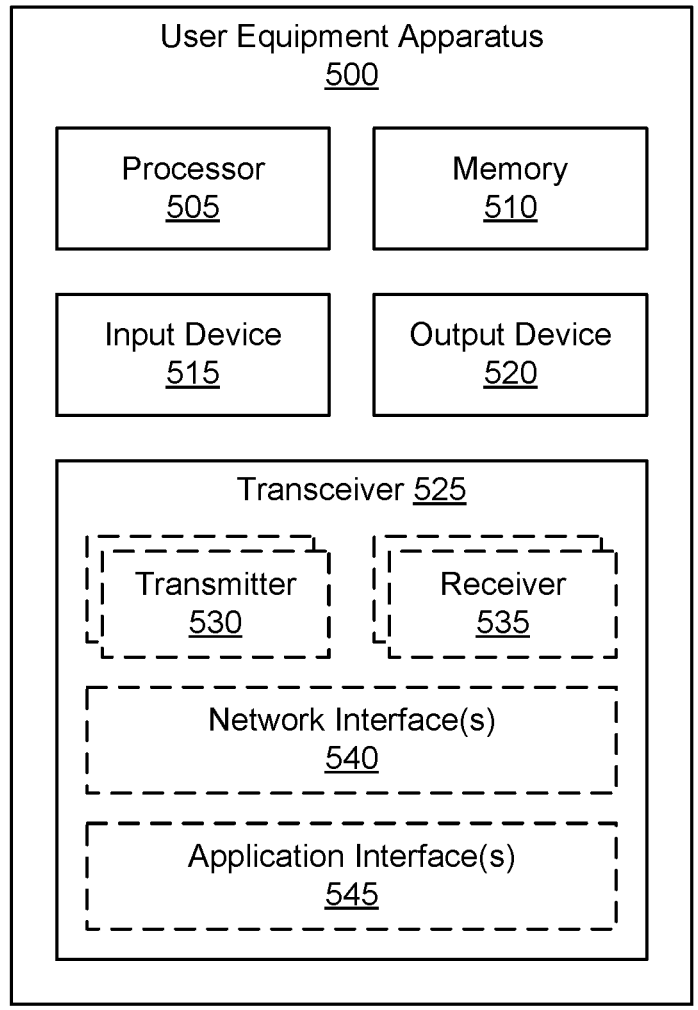
FIG. 5 is a block diagram illustrating one embodiment of a user equipment apparatus that may be used for trigger-based control loop state transition.

FIG. 5 depicts a user equipment apparatus 500 that may be used for trigger-based control loop state transition, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the user equipment apparatus 500 to implement the above described UE behaviors. In one embodiment, the transceiver 525 sends a request to a control loop manager to enable at least one trigger for a control loop of a control system of a mobile wireless communication network, the at least one trigger triggering at least one control loop state transition for the control loop and receives an acknowledgement from the control loop manager that the at least one trigger is enabled for the control loop.

In one embodiment, the transceiver 525 sends a message to the control loop manager to at least one of enable notifications for control loop state transitions for the control loop and enable logging of control loop state transitions for the control loop. In certain embodiments, the transceiver 525 receives a notification of the at least one control loop state change in response to the at least one trigger and sends a direct control loop state change request in response to the notification.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to trigger-based control loop state transition. For example, the memory 510 may store various parameters, panel/beam configurations, resource assignments, policies, and the like, as described above. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
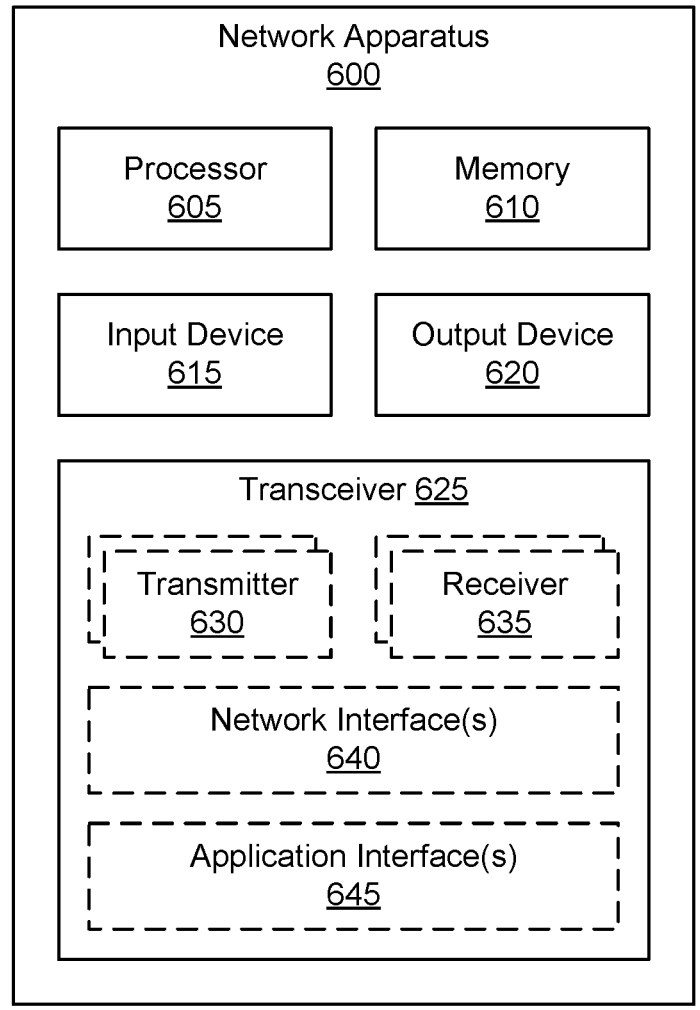
FIG. 6 is a block diagram illustrating one embodiment of a network apparatus that may be used for trigger-based control loop state transition.

FIG. 6 depicts a network apparatus 600 that may be used for trigger-based control loop state transition, according to embodiments of the disclosure. In one embodiment, network apparatus 600 may be one implementation of a RAN node, such as the base unit 121, the RAN node 210, or gNB, described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 805 may include an application processor (also known as "main processor") which manages application-domain and operating system ("OS") functions and a baseband processor (also known as "baseband radio processor") which manages radio function.

In various embodiments, the processor 605 controls the network apparatus 600 to implement the above described behaviors. In one embodiment, the processor 625 enables at least one trigger for a control loop of a control system of a mobile wireless communication network in response to a request from an assurance control loop consumer ("ACLC") and associates the at least one trigger with at least one control loop state transition such that the at least one control loop state transition is activated in response to the at least one trigger being triggered.

In one embodiment, the transceiver 625 sends an acknowledgement to the ACLC that the at least one trigger is activated for the control loop. In one embodiment, the processor 605 configures at least one internal listener for the at least one trigger, the at least one internal listener detecting the at least one trigger and performs the at least one control loop state transition for the control loop in response to the at least one internal listener detecting the at least one trigger being triggered.

In certain embodiments, the transceiver 625, in response to a control loop state transition being performed in the control loop, sends a notification of the control loop state transition to the ACLC, the processor 605 enabling notifications in response to a request from the ACLC to enable notifications. In certain embodiments, the transceiver 625 receives a direct control loop state change request from the ACLC in response to the notification.

In one embodiment, the processor 605 logs the at least one control loop state transition in response to the control loop state transition being performed in the control loop and in response to logging of control loop state transitions for the control loop being enabled. In certain embodiments, the processor 605 verifies that the associated control loop state transition for the at least one trigger exists, and that the processor has authority to execute the control loop state transition in response to the at least one trigger prior to sending the acknowledgement to the ACLC.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to trigger-based control loop state transition. For example, the memory 610 may store parameters, configurations, resource assignments, policies, and the like, as described above. In certain embodiments, the memory 610 also stores program code and related data, such as an operating system or other controller algorithms operating on the network apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the NPN, PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
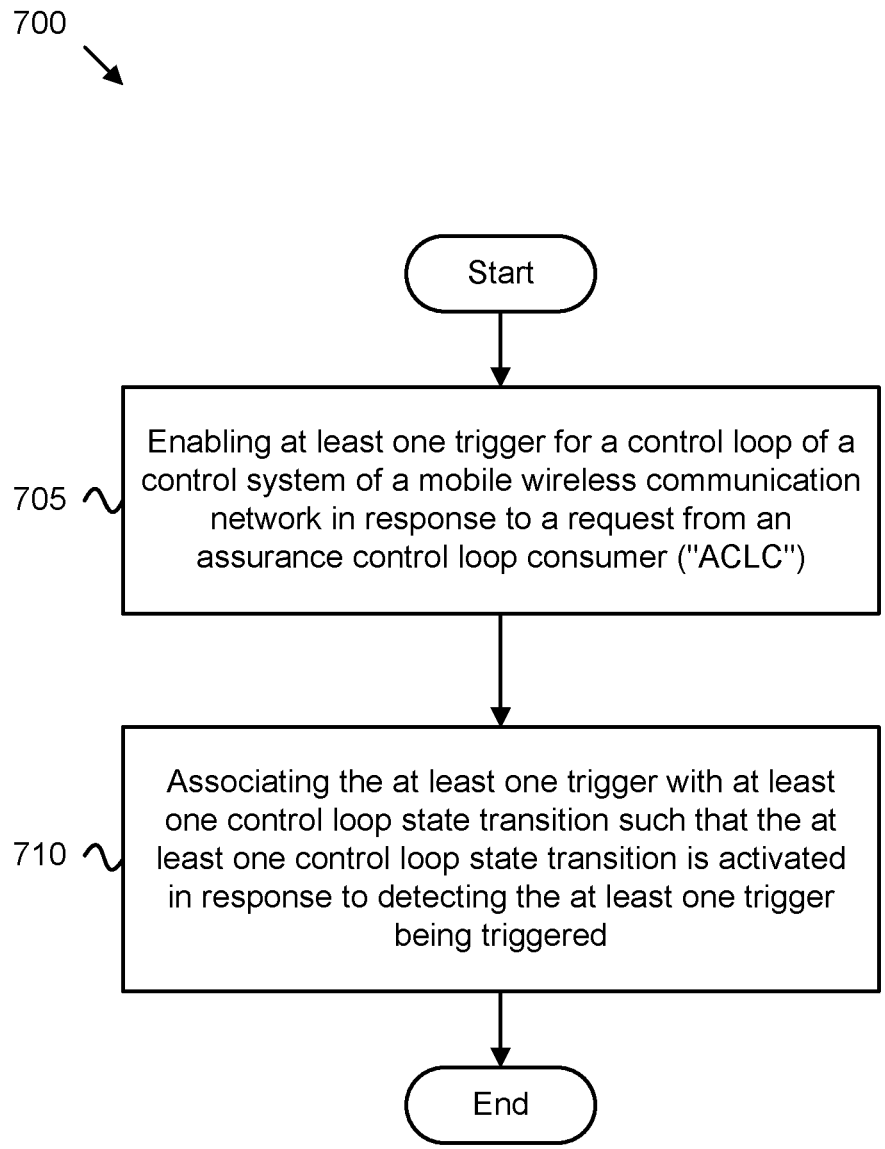
FIG. 7 is a flowchart diagram illustrating one embodiment of a method for trigger-based control loop state transition.

FIG. 7 is a flowchart diagram of a method 700 for trigger-based control loop state transition. The method 700 may be performed by a UE as described herein, for example, the remote unit 105, the UE 205 and/or the user equipment apparatus 500. The method 700, in certain embodiments, is performed by a network apparatus 600. In some embodiments, the method 700 may be performed by a processor executing program code, for example, a microcontroller, a microprocessor, a CPU, a GPU, an auxiliary processing unit, a FPGA, or the like.

The method 700, in one embodiment, includes enabling 705 at least one trigger for a control loop of a control system of a mobile wireless communication network in response to a request from an assurance control loop consumer ("ACLC"). In further embodiments, the method 700 includes associating 710 the at least one trigger with at least one control loop state transition such that the at least one control loop state transition is activated in response to the at least one trigger being triggered. The method 700 ends.

Figure 8:
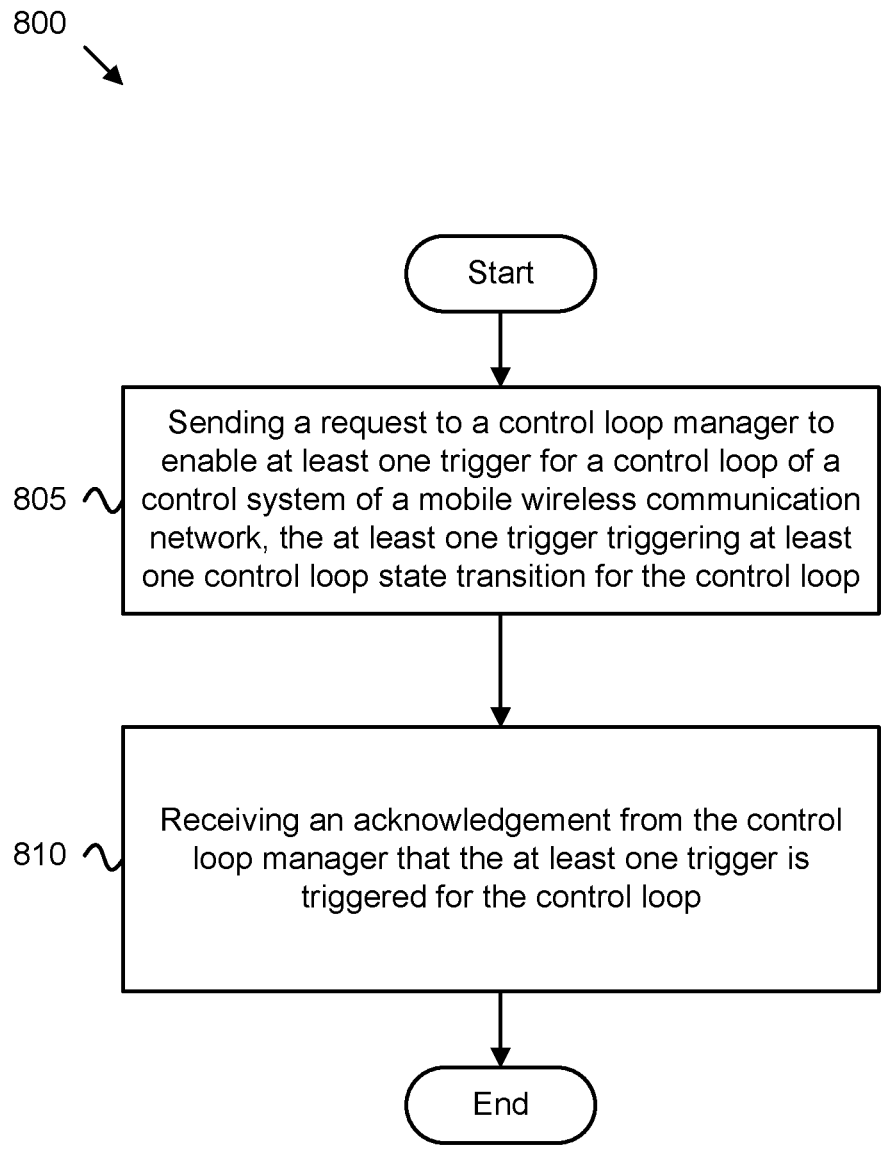
FIG. 8 is a flowchart diagram illustrating one embodiment of another method for trigger-based control loop state transition.

FIG. 8 is a flowchart diagram of a method 800 for trigger-based control loop state transition. The method 800 may be performed by a UE as described herein, for example, the remote unit 105, the UE 205 and/or the user equipment apparatus 500. The method 800 may be performed by a network apparatus 600. In some embodiments, the method 800 may be performed by a processor executing program code, for example, a microcontroller, a microprocessor, a CPU, a GPU, an auxiliary processing unit, a FPGA, or the like.

In one embodiment, the method 800 includes sending 805 a request to a control loop manager to enable at least one trigger for a control loop of a control system of a mobile wireless communication network, the at least one trigger triggering at least one control loop state transition for the control loop. The method 800, in further embodiments, includes receiving 810 an acknowledgement from the control loop manager that the at least one trigger is triggered for the control loop. The method 800 ends.

A first apparatus for trigger-based control loop state transition, in one embodiment, includes a processor that enables at least one trigger for a control loop of a control system of a mobile wireless communication network in response to a request from an assurance control loop consumer ("ACLC") and associates the at least one trigger with at least one control loop state transition such that the at least one control loop state transition is activated in response to the at least one trigger being triggered.

The first apparatus, in one embodiment, further includes a transceiver that sends an acknowledgement to the ACLC that the at least one trigger is activated for the control loop. In one embodiment, the processor configures at least one internal listener for the at least one trigger, the at least one internal listener detecting the at least one trigger and performs the at least one control loop state transition for the control loop in response to the at least one internal listener detecting the at least one trigger being triggered.

In one embodiment, the transceiver, in response to a control loop state transition being performed in the control loop, sends a notification of the control loop state transition to the ACLC, the processor enabling notifications in response to a request from the ACLC to enable notifications. In certain embodiments, the transceiver receives a direct control loop state change request from the ACLC in response to the notification.

In one embodiment, the processor logs the at least one control loop state transition in response to the control loop state transition being performed in the control loop and in response to logging of control loop state transitions for the control loop being enabled. In certain embodiments, the processor verifies that the associated control loop state transition for the at least one trigger exists, and that the processor has authority to execute the control loop state transition in response to the at least one trigger prior to sending the acknowledgement to the ACLC.

In one embodiment, the at least one trigger comprises at least one of a value of a key performance indicator within the mobile wireless communication network, an event within the mobile wireless communication network, a time of day, an operator request, and a control loop state change. In certain embodiments, the at least one control loop state transition comprises at least one of activation of a control loop, deactivation of a control loop, pausing a control loop, suspension of a control loop, continuing a control loop, and execution of the control loop a threshold number of times.

A first method for trigger-based control loop state transition, in one embodiment, includes enabling at least one trigger for a control loop of a control system of a mobile wireless communication network in response to a request from an assurance control loop consumer ("ACLC") and associating the at least one trigger with at least one control loop state transition such that the at least one control loop state transition is activated in response to the at least one trigger being triggered.

The first method, in one embodiment, further includes sending an acknowledgement to the ACLC that the at least one trigger is activated for the control loop. In one embodiment, the processor configures at least one internal listener for the at least one trigger, the at least one internal listener detecting the at least one trigger and performs the at least one control loop state transition for the control loop in response to the at least one internal listener detecting the at least one trigger being triggered.

In one embodiment, the first method includes, in response to a control loop state transition being performed in the control loop, sending a notification of the control loop state transition to the ACLC, notifications being enabled in response to a request from the ACLC to enable notifications. In certain embodiments, the first method includes receiving a direct control loop state change request from the ACLC in response to the notification.

In one embodiment, the first method includes logging the at least one control loop state transition in response to the control loop state transition being performed in the control loop and in response to logging of control loop state transitions for the control loop being enabled. In certain embodiments, the first method includes verifying that the associated control loop state transition for the at least one trigger exists, and that the processor has authority to execute the control loop state transition in response to the at least one trigger prior to sending the acknowledgement to the ACLC.

In one embodiment, the at least one trigger comprises at least one of a value of a key performance indicator within the mobile wireless communication network, an event within the mobile wireless communication network, a time of day, an operator request, and a control loop state change. In certain embodiments, the at least one control loop state transition comprises at least one of activation of a control loop, deactivation of a control loop, pausing a control loop, suspension of a control loop, continuing a control loop, and execution of the control loop a threshold number of times.

A second apparatus for trigger-based control loop state transition, in one embodiment, includes a transceiver that sends a request to a control loop manager to enable at least one trigger for a control loop of a control system of a mobile wireless communication network, the at least one trigger triggering at least one control loop state transition for the control loop, and receives an acknowledgement from the control loop manager that the at least one trigger is enabled for the control loop.

In one embodiment, the transceiver sends a message to the control loop manager to at least one of enable notifications for control loop state transitions for the control loop and enable logging of control loop state transitions for the control loop. In certain embodiments, the transceiver receives a notification of the at least one control loop state change in response to the at least one trigger and sends a direct control loop state change request in response to the notification.

A second method for trigger-based control loop state transition, in one embodiment includes sending a request to a control loop manager to enable at least one trigger for a control loop of a control system of a mobile wireless communication network, the at least one trigger triggering at least one control loop state transition for the control loop and receiving an acknowledgement from the control loop manager that the at least one trigger is enabled for the control loop.

In one embodiment, the second method includes sending a message to the control loop manager to at least one of enable notifications for control loop state transitions for the control loop and enable logging of control loop state transitions for the control loop. In certain embodiments, the second method includes receiving a notification of the at least one control loop state change in response to the at least one trigger and sends a direct control loop state change request in response to the notification.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, comprising:
   at least one memory; and
   at least one processor coupled with the at least one memory and configured to cause the apparatus to:
      enable at least one trigger for a control loop of a control system in response to a request from an assurance control loop consumer ("ACLC");
      associate the at least one trigger with at least one control loop state transition such that the at least one control loop state transition is activated in response to the at least one trigger being triggered;
      enable notifications in response to a request from the ACLC to enable notifications; and transmit a notification of the at least one control loop state transition to the ACLC in response to the at least one control loop state transition being performed in the control loop and in response to notifications being enabled.

2. The apparatus of claim 1, wherein the at least one processor is configured to cause the apparatus to send an acknowledgement to the ACLC that the at least one trigger is activated for the control loop.

3. The apparatus of claim 1, wherein the at least one processor is configured to cause the apparatus to:
configure at least one internal listener for the at least one trigger, the at least one internal listener detecting the at least one trigger; and
perform the at least one control loop state transition for the control loop in response to the at least one internal listener detecting the at least one trigger being triggered.

4. The apparatus of claim 1, wherein the at least one processor is configured to cause the apparatus to receive a direct control loop state change request from the ACLC in response to the notification of the at least one control loop state transition.

5. The apparatus of claim 1, wherein the at least one processor is configured to cause the apparatus to log the at least one control loop state transition in response to the at least one control loop state transition being performed in the control loop and in response to control loop state transition logging for the control loop being enabled.

6. The apparatus of claim 1, wherein the at least one trigger comprises at least one of:
a value of a key performance indicator within a mobile wireless communication network;
an event within the mobile wireless communication network;
a time of day;
an operator request; or
a control loop state change.

7. The apparatus of claim 1, wherein the at least one control loop state transition comprises at least one of:
activation of a control loop;
deactivation of a control loop;
pausing a control loop;
suspension of a control loop;
continuing a control loop; or
the control loop being executed a threshold number of times.

8. A method comprising:
enabling at least one trigger for a control loop of a control system in response to a request from an assurance control loop consumer ("ACLC");
associating the at least one trigger with at least one control loop state transition such that the at least one control loop state transition is activated in response to the at least one trigger being triggered;
enabling notifications in response to a request from the ACLC to enable notifications; and
transmitting a notification of the at least one control loop state transition to the ACLC in response to the at least one control loop state transition being performed in the control loop and in response to notifications being enabled.

9. The method of claim 8, further comprising sending an acknowledgement to the ACLC that the at least one trigger is activated for the control loop.

10. The method of claim 8, further comprising:
configuring at least one internal listener for the at least one trigger, the at least one internal listener detecting the at least one trigger; and
performing the at least one control loop state transition for the control loop in response to the at least one internal listener detecting the at least one trigger being triggered.

11. The method of claim 8, further comprising receiving a direct control loop state change request from the ACLC in response to the notification of the at least one control loop state transition.

12. The method of claim 8, further comprising logging the at least one control loop state transition in response to the control loop state transition being performed in the control loop and in response to control loop state transition logging for the control loop being enabled.

13. The method of claim 8, wherein the at least one trigger comprises at least one of:
a value of a key performance indicator within a mobile wireless communication network;
an event within the mobile wireless communication network;
a time of day;
an operator request; or
a control loop state change.

14. The method of claim 8, wherein the at least one control loop state transition comprises at least one of:
activation of a control loop;
deactivation of a control loop;
pausing a control loop;
suspension of a control loop;
continuing a control loop; or
the control loop being executed a threshold number of times.

15. An apparatus for wireless communication, comprising:
at least one memory; and
at least one processor coupled with the at least one memory and configured to cause the apparatus to:
send a request to a control loop manager to enable at least one trigger for a control loop of a control system, the at least one trigger triggering at least one control loop state transition for the control loop;
receive an acknowledgement from the control loop manager that the at least one trigger is enabled for the control loop; and
receive, in response to a control loop state transition in the control loop, a notification for the control loop state transition in response to notifications for control loop state transitions being enabled for the control loop.

16. The apparatus of claim 15, wherein the at least one processor is configured to cause the apparatus to send a direct control loop state change request to the control loop manager in response to the notification.

17. The apparatus of claim 15, wherein the at least one processor is configured to cause the apparatus to log at least one control loop state transition in response to the at least one control loop state transition being performed in the control loop and in response to control loop state transition logging for the control loop being enabled.

\* \* \* \* \*